United States Patent [19]

Skinner et al.

[11] Patent Number: 5,466,190
[45] Date of Patent: Nov. 14, 1995

[54] PRECLEANER FOR A CLEANING SHOE

[75] Inventors: David A. Skinner, Moline, Ill.; Mark L. Pearson, LeClaire, Iowa

[73] Assignee: Deere & Company, Moline, Ill.

[21] Appl. No.: 280,231

[22] Filed: Jul. 25, 1994

[51] Int. Cl.[6] .................................................. A01F 12/44
[52] U.S. Cl. ........................................... 460/101; 460/94
[58] Field of Search ................................. 460/101, 100, 460/102, 94, 95

[56] References Cited

U.S. PATENT DOCUMENTS

| | | | |
|---|---|---|---|
| 4,250,897 | 2/1981 | Glaser | 460/100 X |
| 4,464,887 | 8/1984 | Decoene et al. | 460/100 X |
| 4,531,528 | 7/1985 | Peters et al. | |
| 5,387,154 | 2/1995 | Peters | 460/100 X |

*Primary Examiner*—Terry Lee Melius

[57] ABSTRACT

The cleaning assembly of the present invention is provided with a precleaner. The precleaner precleans and directs the chaff rich mixture from the separating assembly to the chaffer downstream from where the grain rich mixture from the threshing assembly is introduced to the chaffer. The precleaner is mounted to the chaffer and is provided with a step pan section and a louvered cleaning section for precleaning the chaff rich mixture.

5 Claims, 2 Drawing Sheets

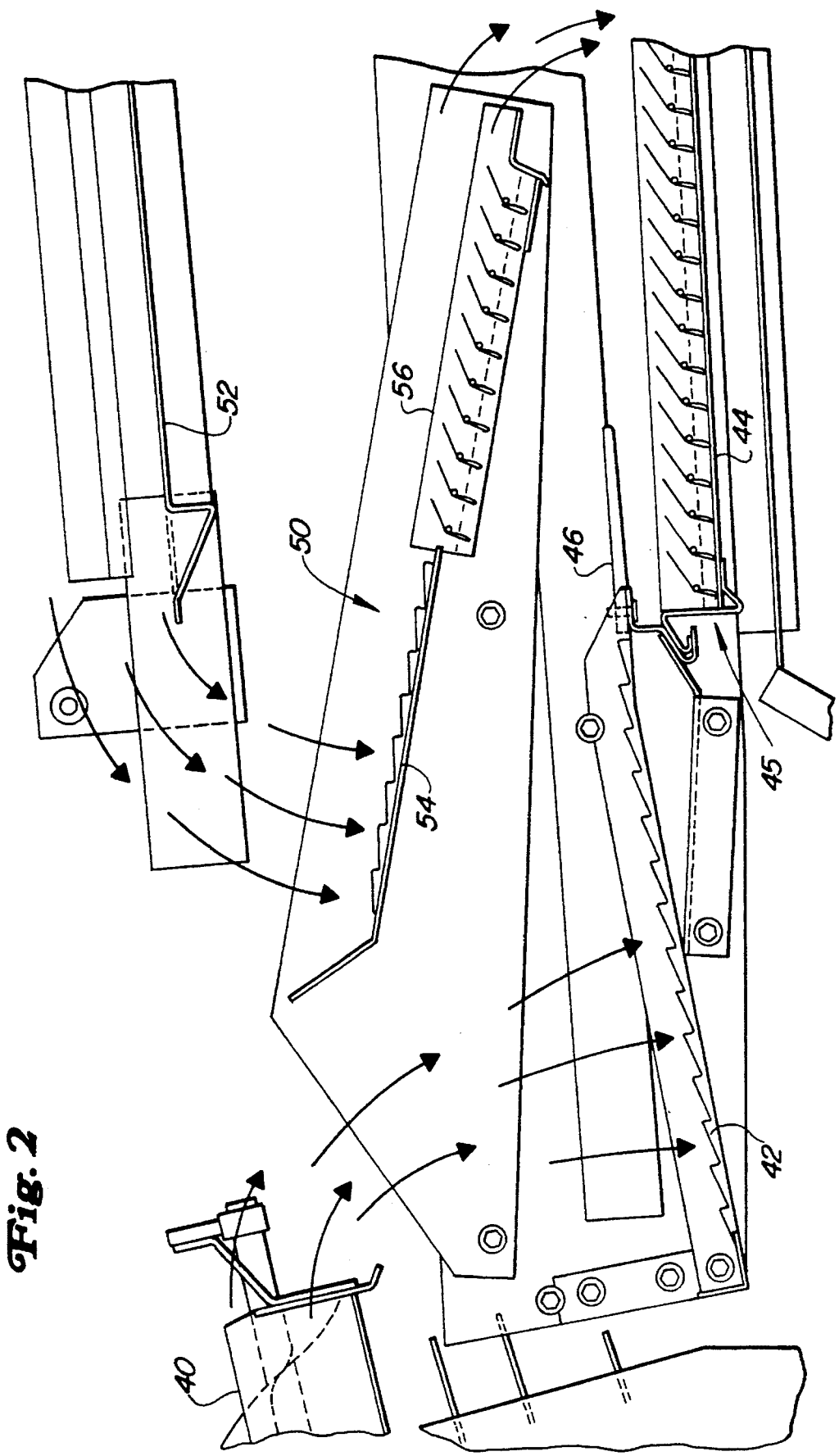

PRECLEANER FOR A CLEANING SHOE

BACKGROUND OF THE INVENTION

1. Field of the Invention

The invention is directed to a mechanism for directing the low grain/high chaff mixture from the separating assembly to a precleaner before introducing this mixture to the chaffer of the cleaning shoe. The high grain/low chaff mixture from the threshing section is introduced to the upstream end of the chaffer, whereas the precleaner introduces the precleaned chaff rich mixture to the chaffer downstream from where the grain rich mixture is introduced.

2. Description of the Prior Art

Typically, a high grain/low chaff mixture from the threshing section is mixed with a low grain/high chaff mixture from the separating section. These combined mixtures are directed to the cleaning assembly for removing the chaff from the grain. In most combines, the cleaning assembly comprises three major components: a cleaning fan, a chaffer and a sieve. The cleaning fan has its own housing, whereas the chaffer and sieve are mounted to the cleaning shoe.

The cleaning fan is a multi-bladed fan located in front of the cleaning shoe. The air blast from the fan removes most of the chaff and straw from the grain by blowing it out the rear of the combine.

The cleaning shoe, which contains the chaffer and sieve, is mounted to the supporting structure of the combine below the separating assembly. The bottom of the cleaning shoe contains the tailings auger and the clean grain auger.

The chaffer and sieve are suspended on hangers attached to the sides of the cleaning shoe. There are three types of typical shoe action, reciprocating, shaking and cascading. In the reciprocating shoe the chaffer and sieve move in opposite directions to one another. In the shaking shoe the chaffer and the sieve move in the same direction. In the cascading shoe the chaffer and sieve are arranged so that the material drops from one unit to another in a cascading or rolling motion.

SUMMARY

It is an object of the present invention to provide a high capacity cleaning shoe.

It is a feature of the present invention that the grain rich mixture from the threshing assembly is directed to the front of the chaffer, while the chaff rich mixture from the separating assembly is directed to a precleaner assembly before being directed to the chaffer.

It is another feature of the present invention that the chaff rich mixture from the separating assembly is directed to the chaffer downstream from the upstream end of the chaffer. The grain rich mixture from the threshing assembly is directed to the upstream end of the chaffer.

In the present invention the grain rich mixture from the threshing assembly is directed to a step pan upstream of the chaffer. The step pan is mounted to the chaffer and moves with the chaffer. The reciprocating or oscillating motion of the chaffer moves the grain rich mixture along the step pan to the upstream end of the chaffer. The chaffer is a typical louvered chaffer allowing grain to fall through the chaffer to the sieve. Chaff is blown rearwardly by the air blast from the cleaning fan.

The chaff rich mixture from the separating assembly is directed to a precleaner, that is mounted to the chaffer. The precleaner is provided with a step pan section and a louvered section. The chaff rich mixture is first directed to the step pan section which through the reciprocating or oscillating motion of the chaffer directs the chaff rich mixture to the louvered section of the precleaner. The louvered section allows grain and some chaff to fall onto the chaffer through the louvers and some of the chaff is blown out the rear of the combine by the air blast of the cleaning fan. The remaining chaff rich mixture cascades off the downstream end of the louvered section onto the chaffer downstream from where the grain rich mixture is introduced into the chaffer.

This arrangement provides a higher capacity cleaning assembly in a smaller package, thus reducing overall cost, weight and size of the cleaning assembly.

BRIEF DESCRIPTION OF THE DRAWINGS

FIG. 2 is a cross sectional side view of the forward portion of the cleaning shoe.

DETAILED DESCRIPTION

Figure 1:
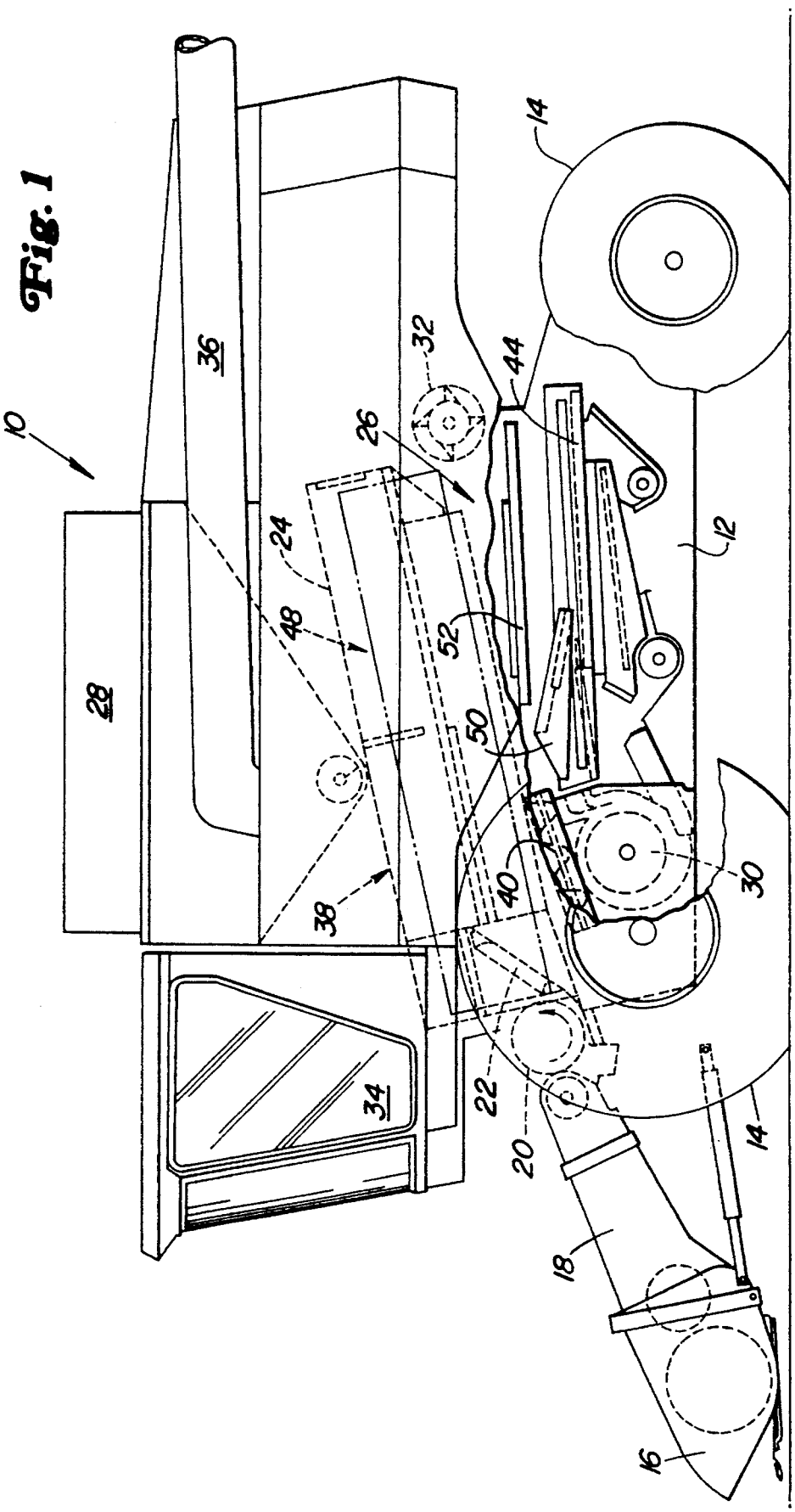
FIG. 1 is a side view of an agricultural combine showing the threshing, separating and cleaning assemblies.

FIG. 1 is the side view of a self-propelled agricultural combine 10. The combine comprises a supporting structure 12 having wheels 14 supporting the frame. The supporting structure comprises two axially extending sidesheets between which are located the various processing assemblies. Extending forwardly from the combine is a harvesting platform 16 which directs a harvested crop to feederhouse 18. The feederhouse is a conveyor for directing the harvested crop material to the threshing, separating and cleaning assemblies located within the sidesheets of the combine. Although the present invention is disclosed as being mounted on a axial combine it may also be used on conventional and other combine configurations having a cleaning shoe.

In the illustrated combine, the feederhouse 18 directs the harvested crop to a transverse beater 20 which propels the crop material through an inlet transition section 22 to an axial threshing and separating assembly 24. Grain and chaff are directed from the axial threshing and separating assembly 24 to cleaning assembly 26. The cleaning assembly in turn directs the clean grain to grain tank 28 and the chaff is blown out the rear of the combine by a three duct cleaning fan 30. Crop material other than grain and chaff is directed by the axial separating unit to transverse beater 32 which propels this material out the rear of the combine. Clean grain temporarily stored in grain tank 28 can be unloaded by an operator in operator's cab 34 actuating unloading auger 36.

Although not as clear cut as on a conventional combine, the illustrated axial combine is provided with a threshing assembly 38 which produces a high grain/low chaff mixture. This grain rich mixture is directed to axial augers 40. These augers direct this grain rich mixture to step pan 42 which is mounted to chaffer 44. The grain rich mixture from augers 40 falls through two air blasts from the cleaning fan 30. The step pan 42 is reciprocated or oscillated with the chaffer and directs the grain rich mixture thereon, through fingerbar 46 to the upstream end 45 of the chaffer 44. The chaffer is a conventional louvered chaffer.

The low grain/high chaff mixture from the separating section 48 is directed to precleaner 50 by pan 52. The precleaner 50 is mounted to the chaffer 44 and moves with the chaffer. The precleaner 50 is provided with a step pan section 54 and a louvered section 56. The chaff rich mixture is first directed to the step pan section 54 which in turn directs the mixture to the louvered section 56. Some grain and chaff falls through the louvered section 56 onto the chaffer 44. The rest of this precleaned mixture cascades onto the chaffer 44 off the downstream end of the louvered section 56. The chaff rich mixture is directed onto the chaffer 44 downstream from where the grain rich mixture is introduced onto the chaffer.

The present invention should not be limited by the above-described embodiment, but should be limited solely by the claims that follow.

I claim:

1. An agricultural combine for harvesting and threshing a crop in a field, the combine comprising:

a supporting structure having ground engaging wheels;

a harvesting assembly for harvesting a crop and directing it into the supporting structure;

a threshing assembly for threshing a harvesting crop producing a grain rich mixture of grain and chaff, the threshing assembly is mounted to the supporting structure;

a separating assembly for separating a threshed crop producing a chaff rich mixture of grain and chaff, the separating assembly is mounted to the supporting structure;

a cleaning assembly for cleaning a harvested and threshed crop, the cleaning assembly is provided with a chaffer having a upstream end, the grain rich mixture from the threshing assembly is directed to the upstream end of the chaffer, whereas the chaff rich mixture from the separating assembly is directed to a precleaner which is mounted to and moves with the chaffer, the precleaner directs the high chaff mixture to the chaffer downstream from the upstream end where the grain rich mixture is introduced.

2. An agricultural combine as defined by claim 1 wherein the precleaner has a step pan section for receiving the chaff rich mixture from the separating assembly.

3. An agricultural combine as defined by claim 2 wherein the precleaner has a louvered section which receives the chaff rich mixture from the step pan section, precleaning and directing the chaff rich mixture to the chaffer.

4. An agricultural combine as defined by claim 3 wherein the upstream end of the chaffer is provided with a step pan for receiving the grain rich mixture from the threshing assembly, the step pan directs the grain rich mixture to the upstream end of the chaffer.

5. An agricultural combine as defined by claim 4 wherein the grain rich mixture from the step pan passes through a fingerbar before being directed to the chaffer.

* * * * *